(12) United States Patent
Wood (10) Patent No.: US 10,757,921 B1
(45) Date of Patent: Sep. 1, 2020

(54) BEEHIVE TREATMENT SYSTEMS

(71) Applicant: Christopher Garrett Wood, San Antonio, TX (US)

(72) Inventor: Christopher Garrett Wood, San Antonio, TX (US)

( * ) Notice: Subject to any disclaimer, the term of this patent is extended or adjusted under 35 U.S.C. 154(b) by 437 days.

(21) Appl. No.: 15/426,918

(22) Filed: Feb. 7, 2017

Related U.S. Application Data (60) Provisional application No. 62/293,226, filed on Feb. 9, 2016.

(51) Int. Cl.
*A01K 51/00* (2006.01)
*A01M 13/00* (2006.01)

(52) U.S. Cl.
CPC ............. *A01K 51/00* (2013.01); *A01M 13/00* (2013.01)

(58) Field of Classification Search
CPC ..... A01K 51/00; A01K 55/00; A01M 1/2077; A01M 13/00; A01M 1/2022; A01M 1/2061; A01M 1/2072; B01D 7/00; B01D 7/02; B05B 7/1686
See application file for complete search history.

(56) References Cited

U.S. PATENT DOCUMENTS

| | | | | |
|---|---|---|---|---|
| 2,662,332 A * | 12/1953 | McIntire | ............. | A01M 1/2077 392/379 |
| 3,255,967 A * | 6/1966 | Kenney | .................... | B05B 1/24 239/133 |
| 5,069,651 A * | 12/1991 | Arndt | .................... | A01K 51/00 449/12 |
| 6,646,014 B2 | 11/2003 | Watkins | | |
| 7,578,722 B1 | 8/2009 | Baumgartner | | |
| 7,766,722 B2 * | 8/2010 | Arndt | .................... | A01K 55/00 43/130 |
| 9,992,978 B2 * | 6/2018 | Maher | .................... | A01K 51/00 |
| 2005/0262756 A1 * | 12/2005 | Younger | ................ | A01K 55/00 43/128 |
| 2014/0048620 A1 * | 2/2014 | Semenov | ............. | B05B 7/1686 239/136 |
| 2015/0296751 A1 * | 10/2015 | Arndt | .................... | A01K 51/00 43/130 |

FOREIGN PATENT DOCUMENTS

| | | | |
|---|---|---|---|
| DE | 20209602 U1 | 12/2002 | |
| DE | 202004005675 U1 | 9/2004 | |
| DE | 202007002266 U1 * | 4/2007 | ............ A01K 51/00 |
| DE | 202007001721 U1 * | 6/2007 | ............ A01K 51/00 |
| RU | 1771633 A1 | 10/1992 | |
| SU | 1683605 A1 | 10/1991 | |
| SU | 1738183 A1 | 6/1992 | |
| WO | 2001095707 A1 | 12/2001 | |

* cited by examiner

*Primary Examiner* — Kathleen I Alker
(74) *Attorney, Agent, or Firm* — Volk & McElroy, LLP; Michael D. Volk, Jr.

(57) ABSTRACT

A beehive treatment system utilizing an oxalic acid vaporization process is used to treat honey bee colonies against the adverse effects of infestation by the Varroa Mite pest. The beehive treatment system includes units having heating chambers configured to vaporize crystalline oxalic acid. Implementations include an air-flow pre heat circuit to prevent crystallization of oxalic acid when treating a beehive.

17 Claims, 8 Drawing Sheets

BEEHIVE TREATMENT SYSTEMS

CROSS-REFERENCE TO RELATED APPLICATIONS

The present application is related to and claims priority from prior provisional application Ser. No. 62/293,226, filed Feb. 9, 2016, entitled "BEE HIVE TREATMENT SYSTEMS", the contents of all of which are incorporated herein by this reference and are not admitted to be prior art with respect to the present invention by the mention in this cross-reference section.

BACKGROUND

The present disclosure relates to beehive treatment systems and more particularly to a unique oxalic acid vaporization technique to treat honey bee colonies against the adverse effects of infestation by the Varroa Mite pest. The Varroa Mite has been identified as the most harmful pest impacting Western honey bees, *Apis mellifera Linnaeus* (Hymenoptera: Apidae). The Varroa destructor species is responsible for the vast majority of the damage attributed to mites. Oxalic acid vaporization has been proven to combat mite reproduction in the honey bee colony at 99.9 percent effectiveness with no evidence of the mite developing treatment resistance over the last 30 years.

It is generally accepted that treatment of beehives using oxalic acid vaporization is safe and effective when properly implemented; however, proper treatment of hives using vaporization is difficult to achieve using current methodologies. An optimized treatment requires both a controlled sublimation of oxalic acid crystals and thorough distribution of the resulting vaporized oxalic acid within the hive enclosure. Furthermore, oxalic acid vapor is potentially hazardous to beekeepers if improperly handled. New treatment systems capable of administering oxalic acid in a safe and controlled manner would be of benefit to many.

DETAILED DESCRIPTION

The present disclosure relates to beehive treatment systems and more particularly to an oxalic acid vaporization technique to treat honey bee colonies against the adverse effects of infestation by the Varroa Mite pest. According to the various implementations of a beehive treatment device of the present disclosure, the vaporization and dispensing of vaporized oxalic acid ($C_2H_2O_4$) is made more effective by implementing a rapid oxalic acid vaporization process that minimizes waste of the compound. As will be shown and described herein, only oxalic acid vapor is dispensed by the device since vapor from the heated oxalic acid is drawn or pulled from a heated chamber while the crystalized oxalic acid within the heated chamber until completely vaporized. Additionally, the various implementations of a beehive treatment device of the present disclosure comprises features structured and arranged to reduce unintentional recrystallization of oxalic acid after being vaporized. Recrystallization of oxalic acid can clog the device and lower user's effectiveness of treating hives. As will be discussed herein, the position of an air flow tube via outlet tube tie-in that avoids a barrel-in-barrel alignment and forward to an outlet tube prevents clogging. Also, an air flow pre-heat circuit described herein heats air in the air flow circuit so that air used with the device does not contribute to oxalic acid recrystallization when the air makes contact with vaporized oxalic acid.

In a general sense, a beehive treatment device of the present disclosure comprises a heating chamber or vessel, a heating element to heat up the heating chamber, a heating chamber inlet to introduce oxalic acid (that will become vaporized when the heating element heats the heating chamber), and an outlet connected to the heating chamber for vaporized oxalic acid to escape. Implementations of the present disclosure comprise an air flow source, which may be a source of compressed air, a fan, an air blower, etc. The air flow source comprises some type of air flow source actuator (an on/off switch, an open/closed valve) and air flow source regulator of the air flow rate (a valve, a fan-speed dial, etc.). The air flow source is connected to an air flow tube. The air flow tube is connected to the outlet via an outlet tube tie-in. In one implementation of the present disclosure, the outlet is an outlet tube and the outlet tube tie-in is connected to an exterior wall of the outlet tube and forward of an opening where the outlet is connected with the heating chamber (see FIG. 6). The outlet tube may be positioned in anywhere so long as it is in communication with the heating chamber. The outlet tube tie-in and outlet tube may alternatively have a barrel-in-barrel arrangement (see FIG. 7). The barrel-in-barrel arrangement is less preferred due to possible recrystallization of oxalic acid in between the outlet tube and outlet tube tie-in (which would cause clogging and would be difficult to clean). The outlet tube may be cleaned by forcing air at a very high rate through the outlet tube. To further prevent crystallization, an air flow tube pre-heat circuit is utilized to heat air from the air flow source. In doing so, when heated air contacts the vaporized oxalic acid, crystallization will be minimized if not eliminated. Without the air flow pre-heat circuit, a temperature difference when non-heated air contacts the vaporized oxalic acid may lead to unintended crystallization of oxalic acid. Various implementations and other features of the beehive treatment devices of the present disclosure will be described below.

Figure 1:
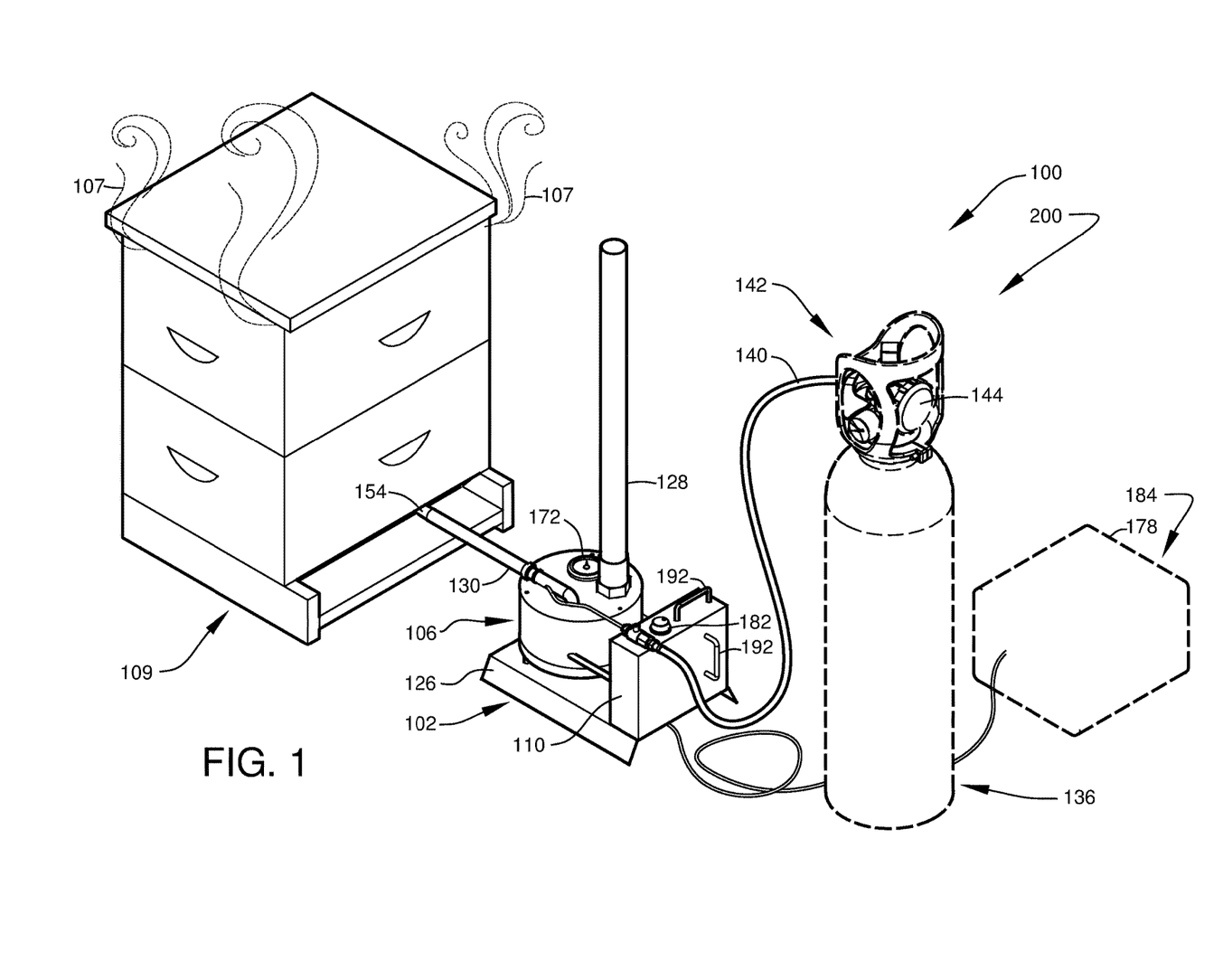
FIG. 1 shows a perspective view illustrating a beehive treatment device of the present disclosure during an "in-use" condition.
Figure 2:
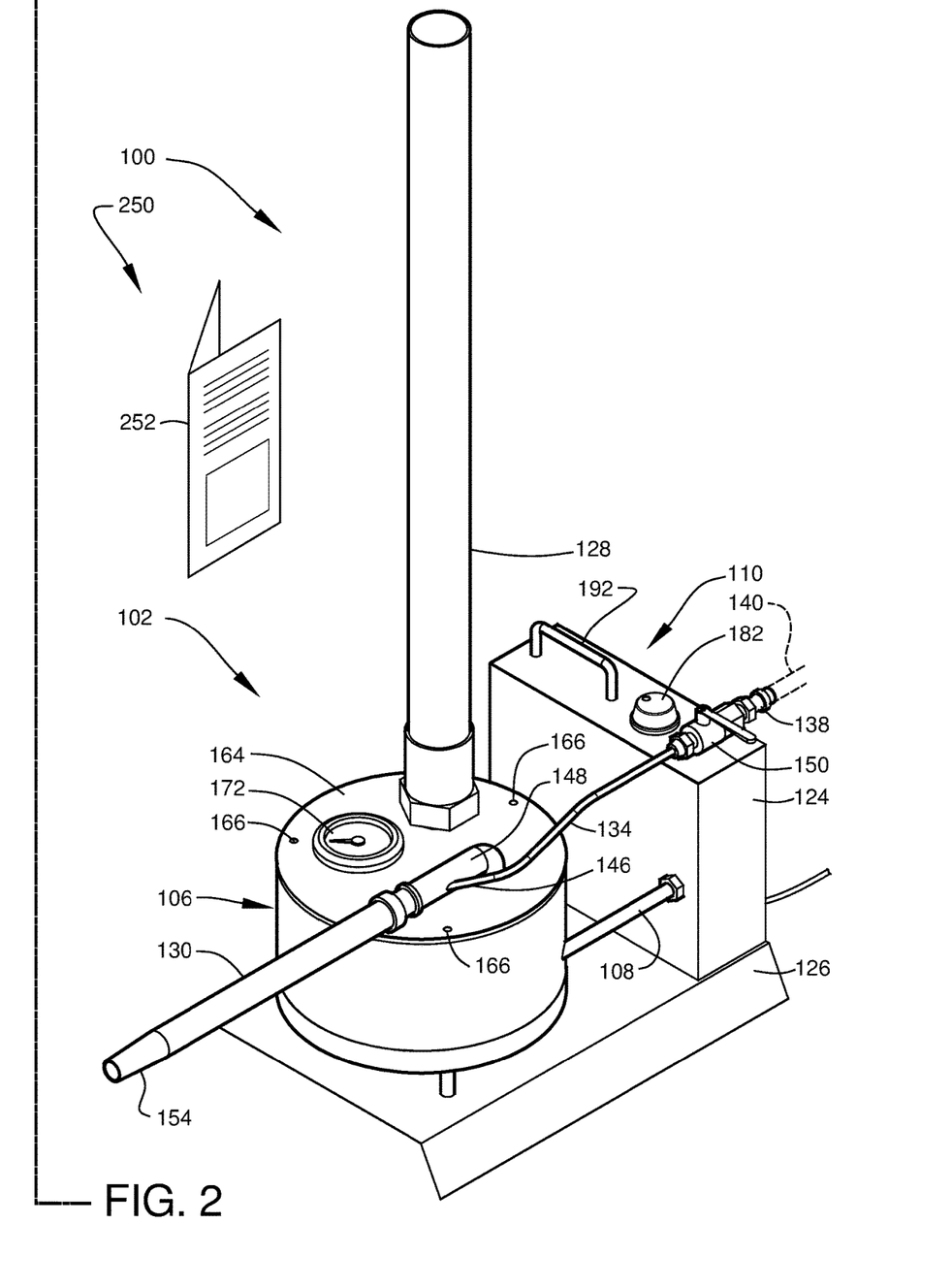
FIG. 2 shows a perspective view illustrating the beehive treatment device of FIG. 1.
Figure 3:
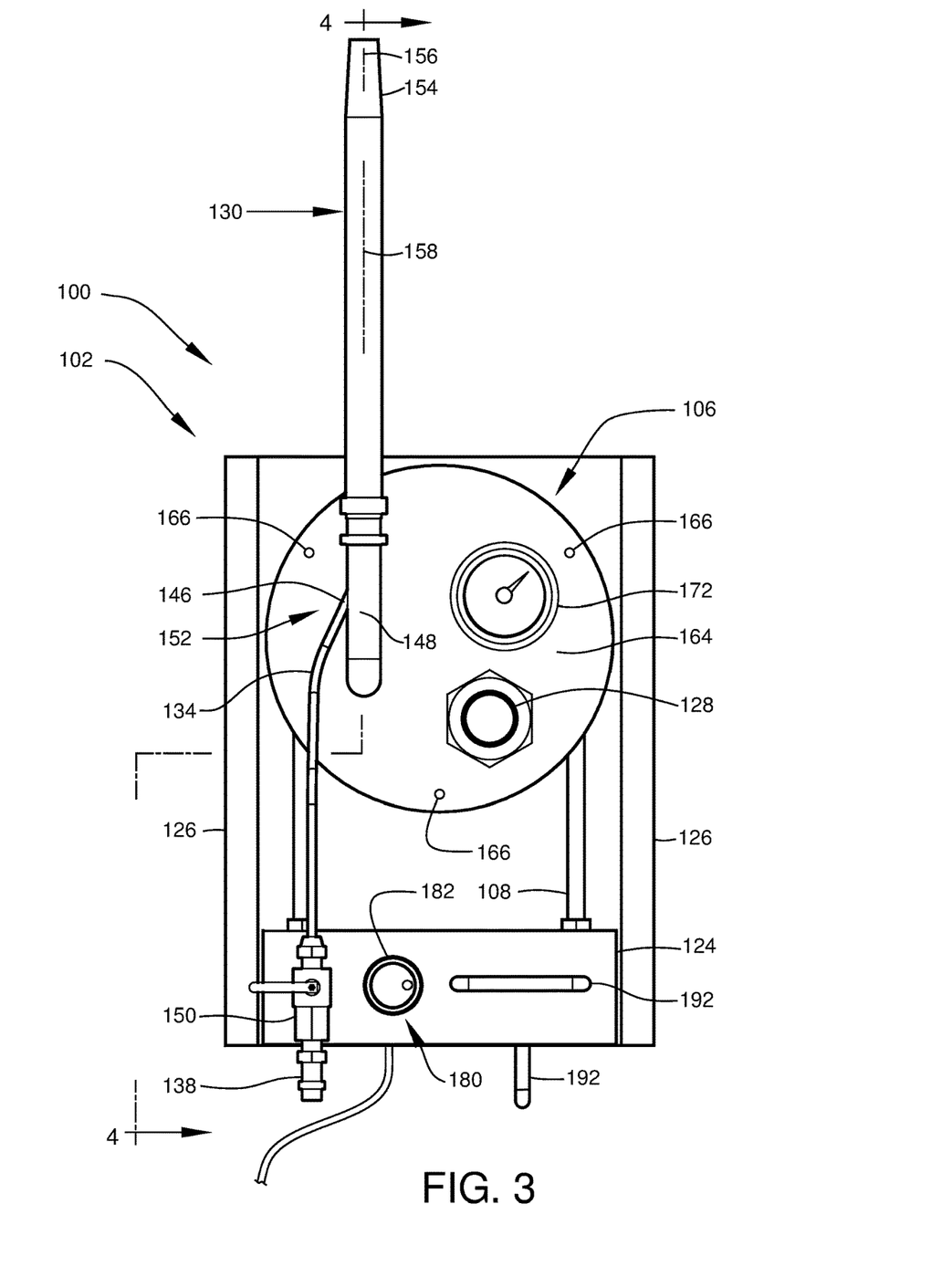
FIG. 3 shows a top view, illustrating the beehive treatment device of FIG. 1.
Figure 4:
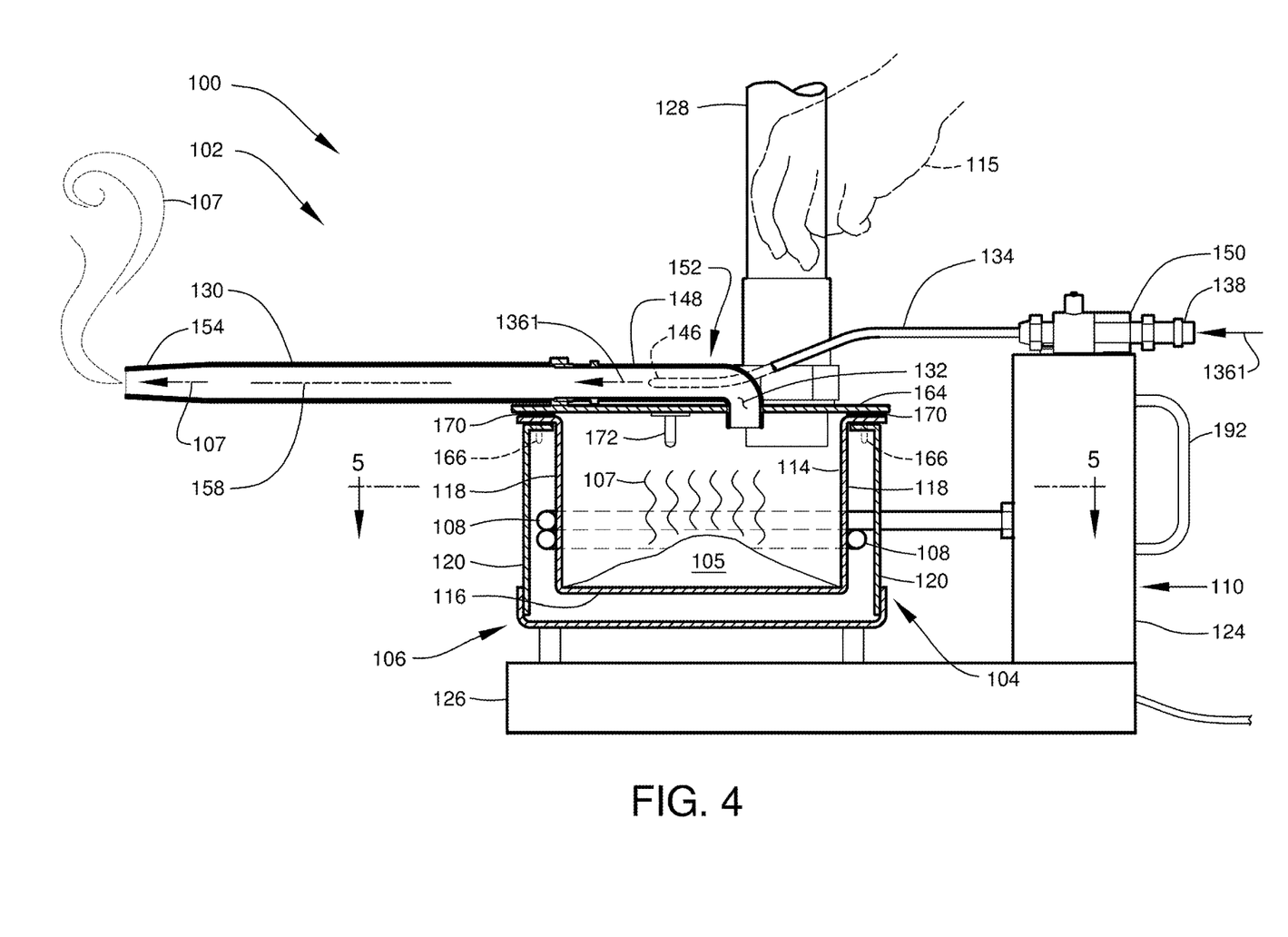
FIG. 4 shows the sectional view 4-4 of FIG. 3.

Referring now more specifically to the drawings, there is shown in FIG. 1 through FIG. 10 various implementations of a beehive treatment system 100. FIG. 1 shows a perspective view illustrating beehive treatment device 102 during an "in-use" condition 200. FIG. 2 shows a perspective view illustrating beehive treatment device 102 of FIG. 1. FIG. 3 shows a top view of beehive treatment device 102 of FIG. 1. FIG. 4 shows the sectional view 4-4 of FIG. 3.

With reference to FIG. 1 through FIG. 4, the hand-transportable apparatus forming the beehive treatment device 102 includes an arrangement of interoperating subcomponents. These subcomponents comprise an internal heating chamber 104 situated within a heating chamber enclosure 106, a heating element 108 that heats the internal heating chamber 104, and an actuator 110 coupled to the heating element 108 to initiate heating of the heating chamber 104. The heating chamber 104 is used to heat crystalline oxalic acid 105 to a temperature sufficient to produce vaporized oxalic acid 107 by sublimation.

According to an implementation of the present disclosure, heating chamber 104 may include inner pot 114 having bottom 116 and surrounding sidewall 118, as shown. Pot 114 may be formed from metal or other heat-resistant materials. Exterior wall 120 of heating chamber enclosure 106 surrounds pot 114 such that the pot 114 is situated within exterior wall 120, as shown. Heating element 108 is positioned between exterior wall 120 of heating chamber enclosure 106 and sidewall 118 of pot 114. Heating element 108 is configured to transfer heat to heating chamber 104 at a controlled temperature sufficient to vaporize crystalline oxalic acid 105 without producing chemical degradation of the compound. Both heating chamber enclosure 106 and outer housing 124 of actuator 110 may be mounted to a rigid base member 126.

Inlet tube 128 (a heating chamber inlet) is connected to internal heating chamber 104 and provides a direct opening into the heating chamber 104 for the introduction of crystalline oxalic acid 105 (see FIG. 4). Inlet tube 128 is shown as an elongated tube. Inlet tube 128 may be removable. A pressure differential developed within heating chamber 104 allows inlet tube 128 to remain open during operation. This permits the introduction of crystalline oxalic acid 105 into inner pot 114 at any time during or prior to operation. The positioning of inlet tube 128 directly above inner pot 114 assists in producing an even distribution of crystalline oxalic acid 105 within the heating chamber 104 thus promoting complete vaporization of the crystalized product.

Figure 10:
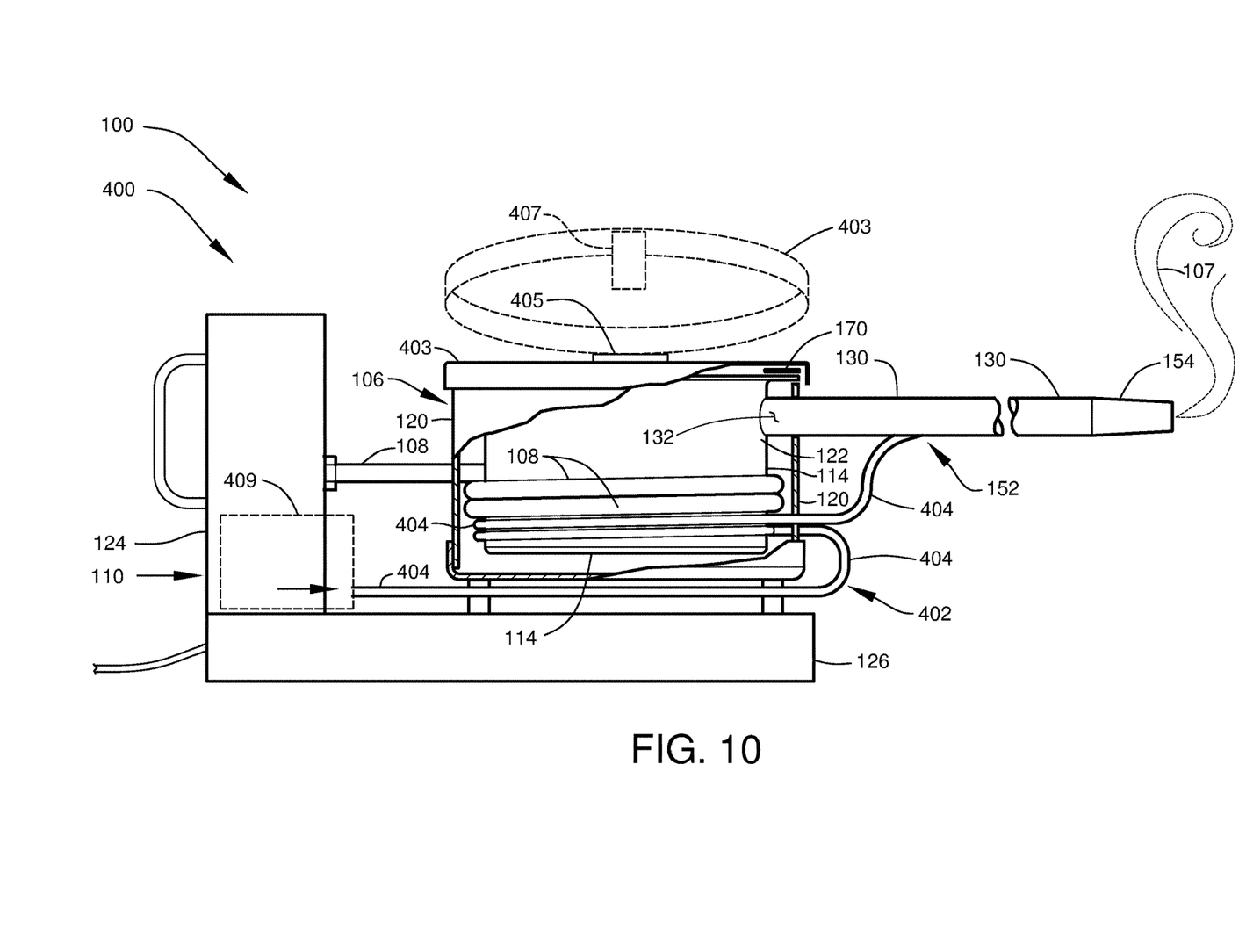
FIG. 10 shows a side view, in partial cut-away section, illustrating an alternate beehive treatment device.

Outlet tube 130 is shown connected to heating chamber 104 through heating chamber enclosure 106, as shown. Outlet tube 130 may be removable. The connection defines an opening 132 connecting the heating chamber 104 with outlet tube 130, as shown. Outlet tube 130 provides a discharge pathway for vaporized oxalic acid 107 generated in heating chamber 104. In FIG. 10, outlet tube 130 is shown in a different position on heating chamber enclosure 106. As shown herein, outlet tube 130 may be placed in numerous positions and achieve the same effect.

The beehive treatment device 102 includes an air flow tube 134 adapted to couple to an air flow source. The present discussion identifies pressurized air as the air flow source which is further identified as compressed air 136 (see FIG. 1). As will be discussed below, other air flow sources may suffice. Air flow from the air flow source through beehive treatment device 102 is shown in various figures as air flow 136l. The distal end of the air flow tube 134 may be equipped with an industry-standard air-hose coupler fitting 138, such as the quick-connect-type fitting depicted in FIG. 2-FIG. 4. This allows the air flow tube 134 and the source of compressed air 136 to be coupled using a flexible airline 140, as shown in FIG. 1. It is noted that implementations of the present system may include the source of compressed air 136. For portability and convenience, the source of compressed air 136 may be a compact compressed-air tank 142 having an integral control valve 144, as shown in FIG. 1. Alternately, the source of compressed air 136 may be substituted with a fan or blower.

Air flow tube 134 comprises an outlet tube tie-in 146 connected to an exterior wall 148 of the outlet tube 130, as shown. According to an implementation of the present disclosure, outlet tube tie-in 146 is located at a point forward of opening 132 connecting heating chamber 104 with outlet tube 130. Air flow tube 134 may also include an air flow regulator depicted as valve 150 located between outlet tube tie-in 146 and the source of compressed air 136. Valve 150 regulates the rate of air flowing into the air flow tube 134. Valve 150 may be secured to outer housing 124 of actuator 110 or other rigid structure of the assembly to prevent damaging the connected components (such as due to repeated use of the device creating vibrations that induce wear and tear on the connected components).

A reduced-pressure suction force is produced within the outlet tube 130 near opening 132 by a reduced-pressure generator assembly 152 operating on Bernoulli's principle of conservation of energy. More specifically, reduced-pressure generator assembly 152 utilizes a stream of compressed air within outlet tube 130 to create a pressure drop near opening 132, thereby drawing the vaporized oxalic acid 107 out of internal heating chamber 104. Vaporized oxalic acid 107 drawn from internal heating chamber 104 is mixed with the compressed air and discharged at the distal end of the outlet tube 130. As outlet tube 130 and internal heating chamber 104 are in fluid communication, a reduced pressure is generated within heating chamber 104 as vaporized oxalic acid 107 is drawn into outlet tube 130. This produces a pressure-biased backflow of air from the higher-pressure inlet tube 128 (the tube where the crystalline oxalic acid 105 is initially inserted) toward the interior of heating chamber 104. This pressure bias prevents vapor from exiting inlet tube 128 into the operator's breathing space (thereby reducing user exposure to oxalic acid vapor). Upon reading this specification, it should be appreciated that, under appropriate circumstances, other pressure modulation assemblies such as, for example, the use of air compressors, a fan positioned at the outlet tube or at an outlet tube tie-in (past the opening of the inlet tube tie-in), one-way gas valves, etc., may suffice.

The distal end of outlet tube 130 transitions into nozzle 154 facilitating insertion into beehives. For example, nozzle 154 is shown inserted into base opening 432 of beehive 109 to administer vapor, as best shown in FIG. 1. Nozzle 154 has a longitudinal axis 156 that may be oriented in the same orientation as longitudinal axis 158 of the outlet tube 130. Nozzle 154 may be tapered along its longitudinal axis 156, as shown. Outlet tube 130 and nozzle 154 each comprise a coaxial barrel 160 having smooth inner bores 162 to assist in cleaning the barrels 160 of any oxalic acid that may re-crystalize during passage through the inner bores 162.

Heating chamber enclosure 106 includes a removable top 164 to enable periodic cleaning and inspection of inner heating chamber 104 and related internal components. As shown in the device of FIG. 1, the device's top 164 has connections for both inlet tube 128 and outlet tube 130. Top 164 forms the upper boundary of heating chamber 104 and is secured to heating chamber 104 with mechanical fasteners. Suitable mechanical fasteners 166 may include screws, bolts, clamps, or other fastening devices. Top 164 is shown fastened to the upper wall of heating chamber 104 with screws (mechanical fasteners 166) and comprises gasket seal 170 preventing vapor from escaping the chamber once screws (or other securing device) are tightened.

Gasket seal 170 may be constructed of a heat-resistant material to prevent melting or deformation during chamber calefaction. Gasket seal 170 also assists to maintain the inner chamber pressure needed to direct vaporized oxalic acid 107 into outlet tube 130 under the lower pressure condition induced during the flow of air 1361 from the source of compressed air 136 through this tube. The orifices of inlet tube 128 and outlet tube 130 may be affixed permanently by brazing or thermal welding.

Heating chamber temperature readout device 172 may be included. In an implementation of the present disclosure, heating chamber temperature readout device 172 is show mounted to top 164, as shown. Heating chamber temperature readout device 172 may be a combined temperature gauge and probe configured to measure and display the temperature within pot 114 during use. Upon reading this specification, it should be appreciated that, under appropriate circumstances, other thermal control and monitoring arrangements such as, for example, a thermally-operated cutoff switch operably coupled to the heating element, mechanical timers, programmable timers, etc., may suffice.

Top 164 may be detachable and, when so, extends the longevity of the device by enabling one to remove solid residue deposited during vaporization process. Outlet tube 130 may also be detached from its connection port for simplified transportation and cleaning. The ease of maintenance afforded by the features of the device facilitate optimal performance and longevity of the apparatus.

The above-described beehive treatment device 102 is configured to heat crystalline oxalic acid 105 inserted into the heating chamber 104 via inlet tube 128 and such air flow tube 134 to outlet tube tie-in 146 configured to prevent the flow of vaporized oxalic acid 107 out of the inlet tube 128 and to direct the vaporized oxalic acid 107 out of the outlet tube 130 when air is flowing through the air flow tube 134 so that vapor is pulled out of the heating chamber 104 under negative pressure to deliver vaporized oxalic acid 107 into the beehive 109.

Referring to FIG. 2, beehive treatment system 100 may be arranged as kit 250. Kit 250 comprises instructions 252. Instructions 252 comprise written details regarding use, maintenance, etc., of the device.

Figure 5:
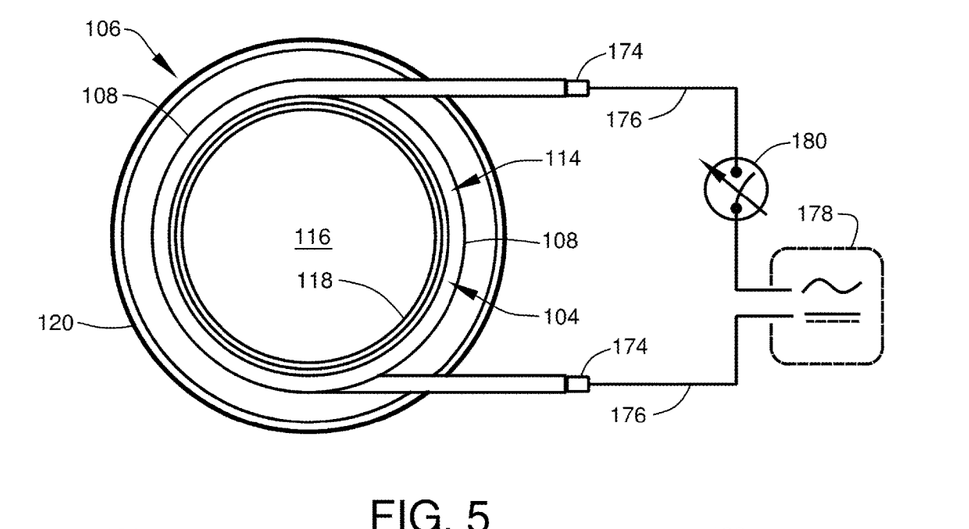
FIG. 5 shows the sectional view 5-5 of FIG. 4.

FIG. 5 shows the sectional view 5-5 of FIG. 4. Visible in FIG. 5 is inner heating chamber including pot 114, exterior wall 120 of heating chamber enclosure 106, and heating element 108. Heating element 108 is positioned between exterior wall 120 of heating chamber enclosure 106 and exterior sidewall 118 of pot 114. To improve heat transfer, heating element 108 may be placed in direct contact with exterior sidewall 118 and may be looped around pot 114 to maximize the contact area. Implementations of beehive treatment device 102 may further include an insulating material surrounding inner pot 114. It is important to note that heating element 108 does not directly contact the crystalline oxalic acid 105 or vaporized oxalic acid 107 to prevent superheating and chemical degradation of the compound. This arrangement also facilitates both the cleaning and maintenance of the device.

Heating element 108 of beehive treatment device 102 may be electrically operated employing resistive heating. Such electrical-resistance-type heating elements may be of a well-known design utilizing, for example, a nichrome wire embedded in a ceramic material. Each end of heating element 108 may be provided with electrical contact 174 and leads 176 that connect contacts 174 to electrical power source 178 (see FIG. 1). At least one of the leads is wired in series with a user-controllable variable thermostat 180 (a temperature adjustment device) allowing one to modulate the temperature within pot 114. Variable thermostat 180 may be of an adjustable bimetallic type, or similar temperature adjustment element that permits a user to adjust the temperature as desired. It is noted that auto-regulation of the temperature of the inner heating chamber 104 is also possible. For example, under appropriate circumstances, pre-set thermostats calibrated with a specific set-point may be suitable. Variable thermostat 180 may include control knob 182 (see FIG. 1) mounted to outer housing 124 of actuator 110 in a user accessible position, as shown in FIG. 3. It is noted that certain features of the disclosed embodiments may be implemented using commercially available components. For example components adaptable for use in the present embodiments may include heating elements, pots, variable thermostats, etc. used in electric melting furnaces distributed by the Lee Precision Company of Hartford, Wis.

Electrical power source 178 may be supplied as alternating current (AC) or direct current (DC). Electrical power source 178 may be a DC source provided by a portable battery pack 184 (see FIG. 1), or similar electrochemical storage device. Alternately, electrical power source 178 may be supplied from an AC source, such as 120-volt or 220-volt mains power. Heating element 108 may have a thermal output of about 500 watts at 120 volts AC. Upon reading this specification, it should be appreciated that, under appropriate circumstances, other heating arrangements such as, for example, vapor-isolated fuel burners, heating elements positioned along the outlet tube to reduce re-crystallization during passage, etc., may be sufficient.

Figure 6:
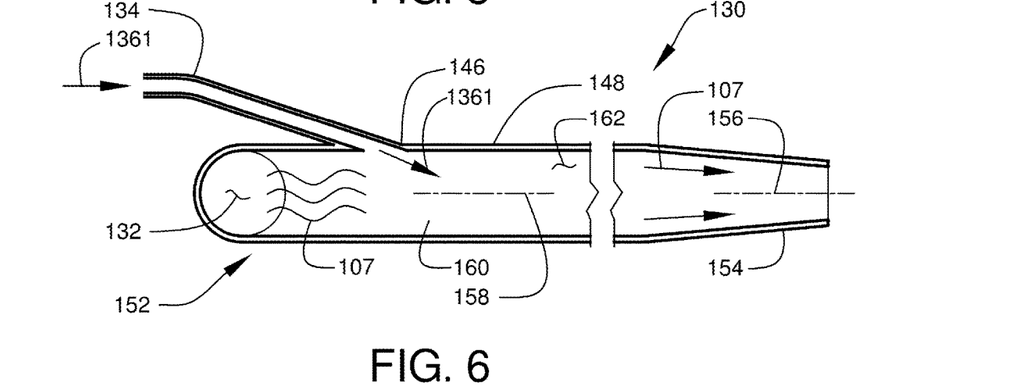
FIG. 6 is a diagrammatic sectional view through an outlet tube of a beehive treatment device of the present disclosure illustrating a reduced-pressure generator assembly.
Figure 7:
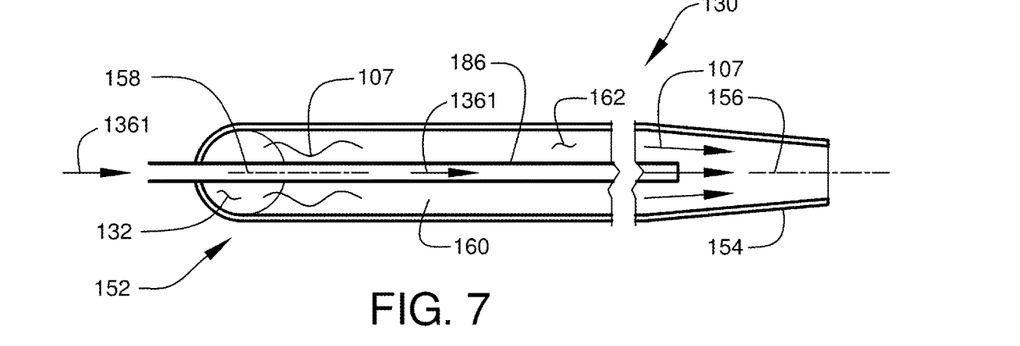
FIG. 7 is a diagrammatic sectional view through an alternate outlet tube arrangement of a beehive treatment device of the present disclosure illustrating a reduced-pressure generator assembly.

FIG. 6 is a diagrammatic sectional view through outlet tube 130 containing reduced-pressure generator assembly 152. In use, valve 150 is opened (see FIG. 3) allowing a stream of compressed air to pass through the outlet tube tie-in 146 and discharge into the outlet tube 130 at a point forward of opening 132. The rapid flow rate of the compressed air produces a pressure drop across opening 132 by the Bernoulli principle in which a region of fast flowing fluid exerts lower pressure on its surroundings than a region of slow flowing fluid. This reduced-pressure condition draws vaporized oxalic acid 107 from heating chamber 104. The resulting air-vapor mixture flows through the outlet tube 130 and is discharged at the nozzle 154.

Valve 150 can supply air at a flow rate sufficient for precluding vapor backflow into inlet tube 128. The suction of vapor from heating chamber 104 through outlet tube 130 under negative pressure conditions assures continuous and steady dispersion of vapor from the device. This method of dispensing oxalic acid vapor is extremely effective due to rapid vaporization and discharge of gaseous oxalic acid only, while leaving the crystalized form behind in the inner chamber of heating chamber 104.

FIG. 7 is a diagrammatic sectional view through another outlet tube 130 containing an alternate reduced-pressure generator assembly 152. In alternate outlet tube 130, a stream of compressed air passes through air flow tube 134 and is directed through outlet tube 130 by transfer tube 186 (a portion of air flow tube 134) oriented coaxially with longitudinal axis 158. The stream of compressed air is discharged from transfer tube 186 at a point forward of opening 132 near nozzle 154. The rapid flow of compressed air exiting the transfer tube 186 produces a pressure drop within inner bore 162 of alternate outlet tube 130, thereby drawing vaporized oxalic acid 107 from heating chamber 104. It should be noted that any performance advantages provided by the tube-in-tube arrangement of FIG. 7 may be offset by the increased difficulty in cleaning the interior of the tube should vapor cooling and deposition of the oxalic acid on the interior surfaces of the tube occur.

Figure 8:
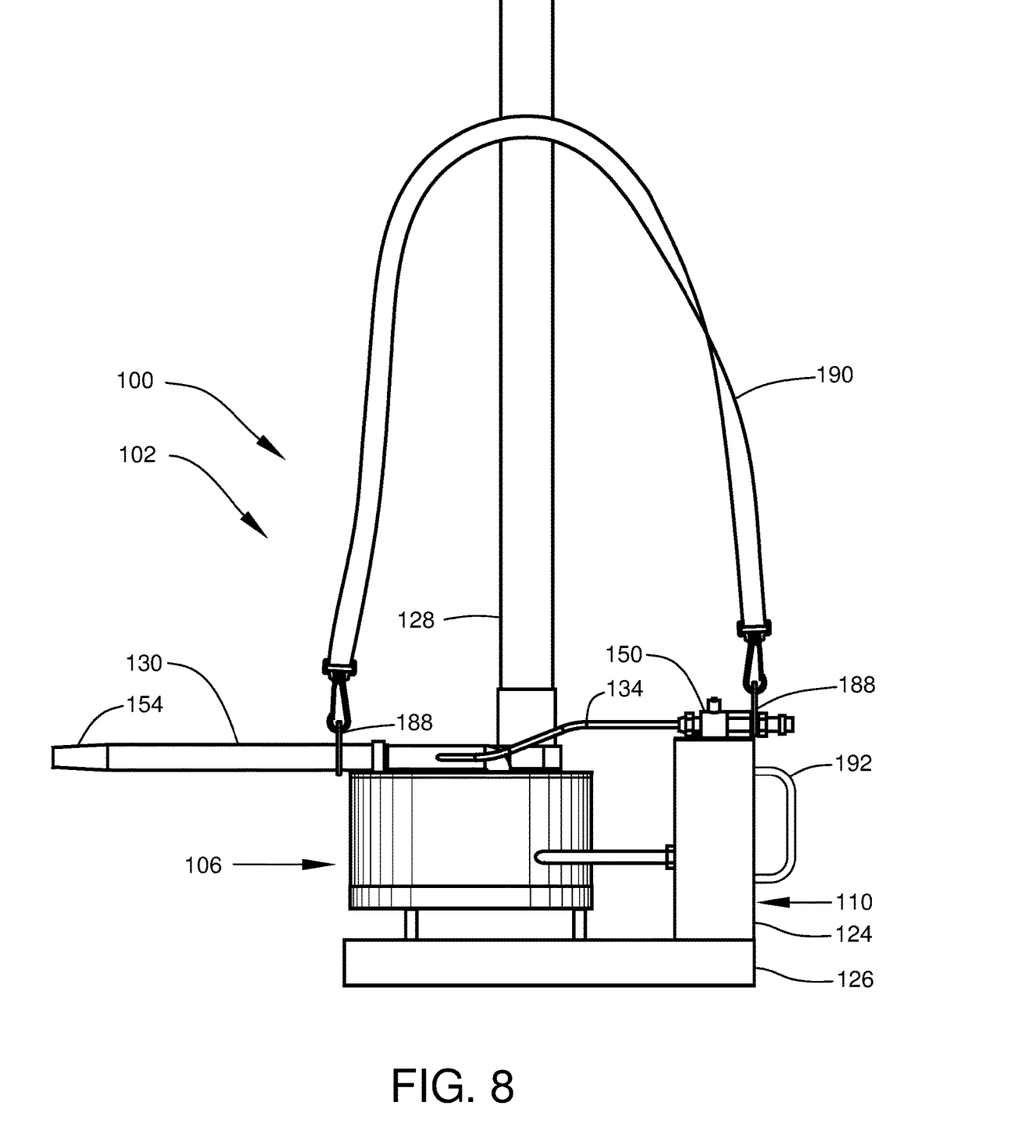
FIG. 8 is a side view of a beehive treatment device of the present disclosure illustrating a shoulder strap feature.

FIG. 8 shows a side view illustrating beehive treatment device 102 including strap attachment points 188 and shoulder strap 190. The device may be modified to be wearable using a harness or shoulder strap 190 to facilitate transport of the device as various beehives in a region are treated. Beehive treatment device 102 may further include at least one handle 192 to assist gripping the device during transport and use. The handle may be mounted to outer housing 124 of actuator 110, as shown. Implementations of the beehive treatment device 102 may have two separate handles 192, as shown, for example, in FIG. 1. Moreover, elongated inlet tube 128 may also be gripped by the user 115 to assist handling of beehive treatment device 102 (see FIG. 4).

The device described herein may be operated in the following manner:

1. Attach inlet tube 128 and outlet tube 130 to the beehive treatment device 102. These components may already be attached. In the implementation shown in FIG. 10, the open top acts as inlet tube 128.

2. Connect air flow tube 134 to the source of compressed air 136 (without opening the air valve 150). In implementations where a fan or blower is used, this step is omitted.

3. Connect the device to the electrical power source 178 (i.e., plug the device into a 120-volt AC electrical outlet or a portable battery pack 184 supplying DC current). Various implementations may comprise an on-board, rechargeable, portable power source. In such implementations, the device is powered on.

4. Adjust the heating element 108 to an initial chamber temperature using the variable thermostat 180. This step may be user mediated or automatic after providing power.

5. Allow the heating chamber 104 to reach the selected vaporization temperature.

6. Monitor the heating chamber temperature readout device 172 and ensure that the heating chamber 104 is at the optimal operating temperature to get a constant vaporization (for example, 500 degrees Fahrenheit). This step may be user mediated or automatic. It should be noted that introduction of the compressed air will reduce the temperature of the heating chamber 104. Improved regulation of the ambient temperature of the heating chamber 104 may allow reduction in the operation temperature below 500 degrees Fahrenheit. Oxalic acid vaporizes at 372 degrees Fahrenheit; thus, to get a steady amount of vapor, the inner chamber should be heated more than 372 degrees Fahrenheit. In Applicant's experience, a good useable range for vaporization of oxalic acid is between about 400 and about 500 degrees Fahrenheit.

7. Once vaporization temperature is reached, open air valve 150 to allow compressed air to flow through outlet tube 130. Valve 150 does not need to be fully opened during this step. In those implementations comprising an air flow pre-heat circuit (e.g., FIGS. 9 and 10), the air flow is heated to prevent recrystallization issues at the outlet tube/air flow interface. In those implementations using a fan or blower, the fan or blower is powered and the air flow rate set. An appropriate air flow regulator is included.

8. The user dons protective gear including an approved breathing mask, which must be worn prior to handling crystalline oxalic acid 105 to avoid injury.

9. Crystalline oxalic acid 105 is introduced into the device through the inlet tube 128 or open top 403 (see FIG. 10).

10. The crystalline oxalic acid 105 is vaporized and discharged through the outlet tube 130. If vaporization does not occur, the user verifies that the temperature of the heating chamber 104 has stabilized at least at approximately 400 degrees Fahrenheit and adjusts the variable thermostat 180, as required.

11. If at any time the user sees vapor coming out of the inlet tube 128 or open top 403, the user will increase the air flow rate to prevent backflow of the oxalic acid vapor into the inlet tube 128 or open top 403.

12. The user continues to add crystalline oxalic acid 105 to inlet tube 128 or open top 403 to create a steady vapor stream.

13. Nozzle 154 of the device is inserted into beehive 109 near the bottom board (see FIG. 1) and the oxalic acid vapor is introduced into beehive 109 until the vapor fumes out at the top.

14. The user treats the next hive.

15. Once hive treatments are completed, the device should be allowed to cool.

16. When cool, inlet tube 128 and outlet tube 130 may be optionally removed (unless these components are permanently attached).

17. The device may be cleaned by removing top 164 or opening top 403 (see FIG. 10) and cleaning the inner chamber and the other components. Additionally, air may be blown through outlet tube at a very high air flow rate to flush out impeding material. In the implementation shown in FIGS. 9 and 10, no recrystallization should be minimal or not occur at all near the heated air flow/outlet tube interface.

Figure 9:
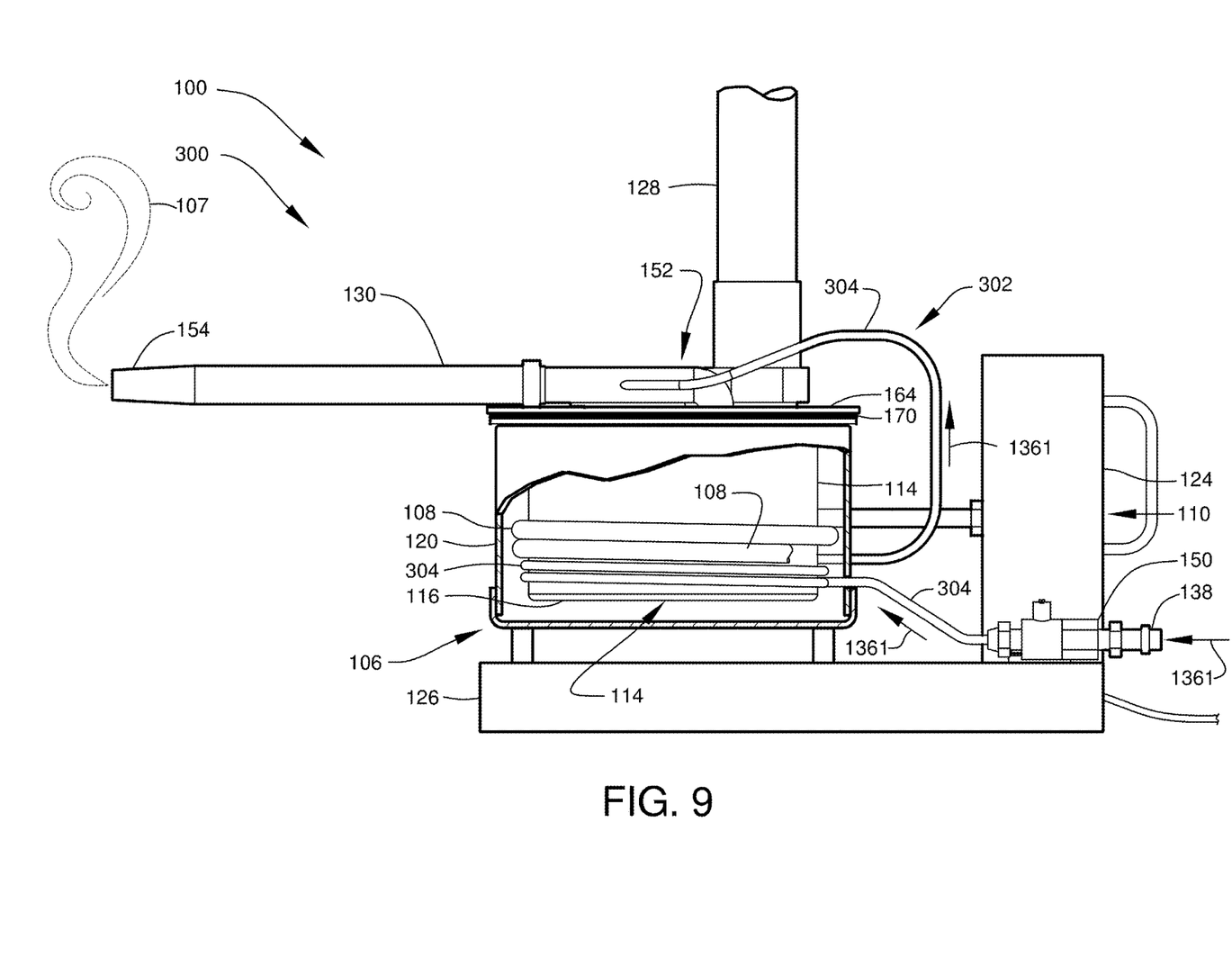
FIG. 9 shows a side view, in partial cut-away section, illustrating an alternate beehive treatment device including an air flow pre-heat circuit feature.

FIG. 9 shows a side view, in partial cut-away section, illustrating alternate beehive treatment device 300 including an added air flow pre-heat circuit 302, according to an implementation of the present disclosure. Pre-heating air reduces recrystallization of vaporized oxalic acid within the outlet tube 130, thus allowing continued use of the apparatus without clogging.

Pre-heating of the air is implemented within the air flow pre-heat circuit 302, as shown. Alternate air flow tube 304 is routed within the heating chamber enclosure 106 prior to discharging at the reduced-pressure generator assembly 152. As shown, a portion of air flow pre-heat circuit 302 is in thermal communication with the heating element 108 (i.e., the heating element will transfer heat to the air within air flow tube). In FIG. 9, alternate air flow tube 304 of air flow pre-heat circuit 302 is coiled around the base of inner pot 114, as shown. The coiled portion of alternate air flow tube 304 may be located in closed proximity to the heating element 108, as shown. In the depicted implementation, the coiled portion of alternate air flow tube 304 is positioned below heating element 108, as shown. Upon reading this specification, it should be appreciated that, under appropriate circumstances, other air flow tube arrangements such as, for example, locating a coil in an alternate position within the heated chamber, utilizing an alternate source of heat, including in-line couplers to assist installation or replacement of the tube, etc., may be sufficient.

FIG. 10 shows a side view, in partial cut-away section, illustrating alternate beehive treatment device 400, according to another implementation of the present disclosure. The configuration of alternate beehive treatment device 400 varies from the prior-disclosed implementations. First, outlet tube 130 is joined with exterior wall 122 of pot 114 and extends outwardly through a forward exterior wall 120 of the heating chamber enclosure 106, as shown. As with the prior embodiments, the opening of outlet tube 130 is in fluid communication with interior of the pot 114.

Second, a hinged top 403 is used to cover and seal the inner pot 114, as shown. The revised top 403 includes at least one side-mounted hinge 405 to allow the top to pivot up and down (as diagrammatically depicted with dashed lines). A latch 407 (at least embodying herein a securing device to keep top 403 closed) allows the top 403 to be secure in a closed position when the device is not in use. When top 403 is in the open position (a heating chamber inlet) access to the interior of the pot 114 is provided. Note that the inlet tube 128 (see FIG. 9) has been omitted from the top 403 in this alternate implementation. Top 403 is in an open state to deposit crystalline oxalic acid into pot 114 and is left open while oxalic acid is being vaporized (top 403 left open performs the functions of inlet tube 128).

Third, a revised air flow pre-heat circuit 402 is provided. This alternate air flow pre-heat circuit 402 includes an air flow tube 404 that is operably coupled with air flow source 409, diagrammatically depicted with dashed lines, which may be compressed air, a fan, blower, or other air flow source. Air flow tube 404 is routed through the forward exterior wall 120 of the heating chamber enclosure 106, as shown. Once inside heating chamber enclosure 106, air flow tube 404 encircles the base of pot 114 before passing outwardly from the heating chamber enclosure 106, as shown. In FIG. 10, air flow tube 404 forms a coil located near heating element 108, as shown. Thus, it may be stated that a portion of air flow tube 404 is in thermal communication with heating element 108 to heat air occupying air flow tube 404.

After exiting the heating chamber enclosure 106, air flow tube 404, carrying heated air, intersects outlet tube 130 at the reduced-pressure generator assembly 152, as shown. Air flow tube 404 intersects outlet tube 130 in the manner shown in FIG. 6 in the implementation shown in FIG. 10. In the implementation shown in FIG. 10, with top 403 open, vaporized oxalic acid 107 is drawn from pot 114 by moving air and is discharged at the distal end of the outlet tube 130, as shown. Upon reading this specification, it should be appreciated that, under appropriate circumstances, considering such issues as user preferences, design preference, structural requirements, marketing preferences, cost, available materials, technological advances, etc., other air flow tube arrangements such as, for example, entering the heated chamber at an alternate point, utilizing an alternate source of heat, adding in-line couplers to assist installation or replacement of the tube, etc., may be sufficient.

Although applicant has described various implementations of the present invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:
1. A beehive treatment device comprising:
  a) a heating chamber;
  b) a heating element that heats said heating chamber;
  c) a heating chamber enclosure;
  d) said heating chamber situated within said heating chamber enclosure;
  e) a heating chamber inlet to insert crystalline oxalic acid into said heating chamber;
  f) an outlet tube connected to said heating chamber through said heating chamber enclosure, such connection defining an opening connecting said heating chamber with said outlet tube, said outlet tube providing an outlet for vaporized oxalic acid from said heating chamber;
  g) an air flow tube connected to an air flow source and to an outlet tube tie-in;
  h) said outlet tube tie-in connected to an exterior wall of said outlet tube and forward of said opening connecting said heating chamber with said outlet tube;
  i) at least one portion of said air flow tube is in thermal communication with said heating element to heat air from the said air flow source when said heating element is actively heating said heating chamber; and
  j) said beehive treatment device is configured to heat the crystalline oxalic acid inserted into said heating chamber via said heating chamber inlet to produce vaporized oxalic acid, said air flow tube and said outlet tube tie-in is configured to prevent the vaporized oxalic acid flowing out of said heating chamber inlet and to direct the vaporized oxalic acid out of said outlet tube when air is flowing through said air flow tube so that the vaporized oxalic acid is pulled out of said heating chamber under negative pressure to deliver the vaporized oxalic acid into a beehive, and said air flow tube is in thermal communication with said heating chamber to heat air in said air flow tube to prevent recrystallization of the vaporized oxalic acid.

2. The beehive treatment device of claim 1 further comprising an air flow source regulator to regulate air flow rate in said air flow tube.

3. The beehive treatment device of claim 1, said air flow source comprising a source of compressed air.

4. The beehive treatment device of claim 1, said air flow source comprising a fan.

5. The beehive treatment device of claim 1, said air flow source comprising an air blower.

6. The beehive treatment device of claim 1 further comprising an actuator configured to initiate heating of said heating element to heat said heating chamber.

7. The beehive treatment device of claim 1 further comprising a heating chamber temperature readout device and a temperature adjustment device permitting a user to adjust temperature.

8. The beehive treatment device of claim 1, said heating chamber comprising a pot having a bottom and surrounding sidewall, said heating chamber enclosure comprising an exterior wall, and said pot situated within said exterior wall of said heating chamber enclosure, and said heating element is situated between said exterior wall of said heating chamber enclosure and said surrounding sidewall of said pot.

9. The beehive treatment device of claim 8, said air flow tube is situated between said exterior wall of said heating chamber enclosure and said surrounding sidewall of said pot.

10. The beehive treatment device of claim 1, said heating chamber enclosure comprising a hinged top.

11. The beehive treatment device of claim 10, said hinged top comprising a securing device to keep said hinged top closed.

12. The beehive treatment device of claim 1, said outlet tube transitioning into a nozzle to facilitate insertion into a hive opening to administer vaporized oxalic acid.

13. The beehive treatment device of claim 1 further comprising at least one handle.

14. The beehive treatment device of claim 1 further comprising at least one strap attachment point.

15. The beehive treatment device of claim 1 wherein said heating chamber inlet further comprises an elongated tube that is grippable to assist handling said beehive treatment device.

16. A method of treating a beehive comprising the steps of:
  a) providing a beehive treatment device comprising
    i) a heating chamber;
    ii) a heating element that heats the said heating chamber;
    iii) a heating chamber enclosure;
    iv) said heating chamber situated within said heating chamber enclosure;
    v) a heating chamber inlet to insert crystalline oxalic acid into said heating chamber;
    vi) an outlet tube connected to said heating chamber through said heating chamber enclosure, such connection defining an opening connecting said heating chamber with said outlet tube, said outlet tube providing an outlet for vaporized oxalic acid from said heating chamber;
    vii) an air flow tube connected to an air flow source and to an outlet tube tie-in;
    viii) said outlet tube tie-in connected to an exterior wall of said outlet tube and forward of said opening connecting said heating chamber with said outlet tube; and
    ix) at least one portion of said air flow tube is in thermal communication with said heating element to heat air from said air flow source when said heating element is actively heating said heating chamber;
  b) inserting crystalline oxalic acid into said heating chamber inlet;
  c) heating the crystalline oxalic acid to produce the vaporized oxalic acid;
  d) initiating air flow through said air flow tube;
  e) heating the air in said air flow tube before the air in said air flow tube reaches said outlet tube; and
  f) placing said outlet tube into a beehive opening so that the vaporized oxalic acid is dispensed in the beehive.

17. The method of claim 16, said air flow source comprising a source of compressed air, a fan, or a blower.

* * * * *